W. W. HUBBARD.
Corn-Planter.
No. 67,115.
Patented July 23, 1867.
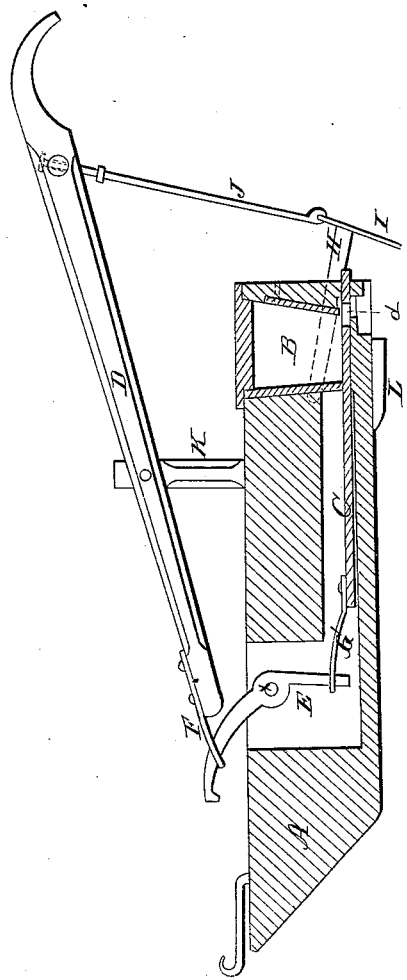
Witnesses:
Inventor:

United States Patent Office

W. W. HUBBARD, OF EDINBURG, INDIANA.

Letters Patent No. 67,115, dated July 23, 1867.

---

IMPROVEMENT IN CORN-PLANTER.

---

*The Schedule referred to in these Letters Patent and making part of the same.*

---

TO ALL WHOM IT MAY CONCERN:

Be it known that I, W. W. HUBBARD, of Edinburg, in the county of Johnson, and in the State of Indiana, have invented certain new and useful Improvements in Corn-Planters; and do hereby declare that the following is a full, clear, and exact description thereof, reference being had to the accompanying drawings, and to the letters of reference marked thereon.

In the annexed drawings, making part of this specification, A represents a log of wood which is bevelled off at its forward end, so that it will run along easily in a furrow. A hook or clevis is attached to the forward end of it for the purpose of attaching power. B represents an opening cut into the log or drag, from its upper side and near its rear end, which is intended for a corn-hopper. In an opening running longitudinally and forward from the seed-hopper is placed a seed-slide, C, on the forward end of which is a metallic plate, G, in which is cut a slot to receive the lower end of a lever, E. E represents a bent or elbow-lever which is pivoted in the block or log at $x$, in a slot or mortise made to receive it. The upper and of this lever runs through a slot in a plate, F which said plate is secured to the ends of the handles D. The handles D are pivoted to and supported by a standard, K, erected upon the upper side of the log or drag. $a$ represents the grain-opening in the slide C. This opening receives the corn, carries it beneath the rear side of the hopper, which acts as a cut-off, and deposits it in the furrow behind the drag or log. The said slide is given a longitudinal reciprocating motion by the raising and lowering of the handles. When the forward ends of the handles are raised by depressing their rear ends, they operate the lever E so as to draw the said slide forward or in; but when said forward ends are depressed by elevating their rear ends, the seed-slide is moved backward, carrying out grain in its aperture $a$. J represents a rod which runs down from one of the rounds of the handles, and connects to the top of a hoe or coverer I. H H represent two straps or bars which are pivoted, one on each side of the rear end of the drag, and which connect at their rear ends to the hoe or coverer I. When the handles are raised and lowered this hoe or coverer is also raised or lowered, and serves to cover the corn as fast as it is dropped from the said slide. Instead of this coverer, I may secure to the rear end of the log or drag any well-known and suitable device for covering corn without the motion of the handles. A mole or flange is formed or secured, as seen at L, to the under side of the log, near its rear end, which will form a small and deeper furrow in the bottom of the large one.

This is a very convenient and simple device for planting corn, and one which can be put in the reach of all farmers on account of its cheapness.

In using this machine, the ground is first laid off, and then this log is dragged in the furrow, the operator dropping the seed either in check-rows or at will.

Having thus fully described my invention, what I claim as new, and desire to secure by Letters Patent, is—

1. The log or drag A, provided with a seed or corn-hopper in its rear end or used with it, as and for the purpose set forth.

2. The handles D, lever E, and seed-slide C, arranged with the log with a hole through its centre and hopper B, as and for the purpose set forth.

3. The hoe or coverer I, connected to the drag and handles, and operating substantially as and for the purpose set forth.

4. The mole or flange L on the under side of the log or drag, used substantially as and for the purpose set forth.

In testimony that I claim the foregoing I have hereunto set my hand this 6th day of June, 1867.

W. W. HUBBARD.

Witnesses:
A. N. MARR,
EDM. F. BROWN.